(12) United States Patent
Shigeeda

(10) Patent No.: US 7,561,297 B2
(45) Date of Patent: Jul. 14, 2009

(54) DISPLAY METHOD DURING SENSED IMAGE RECORDING IN IMAGE SENSING APPARATUS

(75) Inventor: Soichiro Shigeeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 937 days.

(21) Appl. No.: 11/220,959

(22) Filed: Sep. 7, 2005

(65) Prior Publication Data

US 2006/0050331 A1      Mar. 9, 2006

(30) Foreign Application Priority Data

Sep. 7, 2004   (JP) .............................. 2004-259978

(51) Int. Cl.
*G06K 15/00*   (2006.01)
*H04N 1/04*    (2006.01)
*H04N 1/46*    (2006.01)
*G06T 1/60*    (2006.01)

(52) U.S. Cl. .................... 358/1.18; 358/1.16; 358/474; 345/530

(58) Field of Classification Search ................. 345/530, 345/204; 358/1.6, 1.15, 1.16, 1.17, 1.18, 358/400, 474, 505, 530, 401, 404, 444, 426.05, 358/448, 479; 382/312
See application file for complete search history.

(56) References Cited

U.S. PATENT DOCUMENTS

| | | | | |
|---|---|---|---|---|
| 5,499,362 A | * | 3/1996 | Kawai et al. | .............. 358/1.9 |
| 2005/0010652 A1 | * | 1/2005 | Lebrun | .............. 709/219 |
| 2005/0140802 A1 | * | 6/2005 | Nam | .............. 348/239 |

FOREIGN PATENT DOCUMENTS

JP         2002-109870         4/2002

* cited by examiner

*Primary Examiner*—Jerome Grant, II
(74) *Attorney, Agent, or Firm*—Cowan, Liebowitz & Latman, P.C.

(57) ABSTRACT

An image sensing apparatus senses light from an object and outputs electrical image data. The apparatus stores a predetermined volume of the image data and records the recorded image data on a recording medium. During the recording, the apparatus simultaneously displays an image of image data currently being sensed in a main display area of a display unit and displays an image of the image data being recorded on the recording medium in a sub-display area.

17 Claims, 11 Drawing Sheets

FIG. 11

SELECT IMAGE TO BE DISPLAYED
IN SUB-DISPLAY AREA

| MOVING IMAGE AT N-TIMES SPEED |

ONE FRAME FROM MOVING IMAGE
FIRST FRAME OF MOVING IMAGE
CHARACTER STRING
NONE

DISPLAY METHOD DURING SENSED IMAGE RECORDING IN IMAGE SENSING APPARATUS

FIELD OF THE INVENTION

The present invention relates to an image sensing apparatus which can sense a moving image or still image and record the image on a recording medium and a control method for the image sensing apparatus.

BACKGROUND OF THE INVENTION

Conventionally, an intermittent recording type image sensing apparatus accumulates sensed image data in an internal memory over a predetermined time or to a predetermined volume and writes the image data to a recording medium at N-times speed at predetermined intervals. Upon the operation to end image sensing, the image sensing apparatus starts the process of writing image data accumulated in the internal memory at that time to the recording medium. After the writing process is completed, the image sensing is completed.

As means for indicating to the user that writing to a recording medium is in progress, there have conventionally been proposed LED flashing means for indicating access to a recording medium, display means for displaying a "writing in progress" message or the like on a display monitor, and the like (see, e.g., Japanese Patent Laid-Open No. 2002-109870).

However, with each of the above-described conventional means, an intermittent recording type image sensing apparatus has the following problem. More specifically, although the user can recognize that writing to a recording medium is in progress, he/she has much difficulty in recognizing which sensed image is being written to the recording medium and how much time is required for the writing.

SUMMARY OF THE INVENTION

The present invention has been made in consideration of the above situation, and has as its object to make the user to easily recognize the progress of the process of writing image data to a recording medium.

According to the present invention, the foregoing object is attained by providing an image sensing apparatus comprising:

an image sensor that senses light from an object and outputs electrical image data;

a memory that has capacity enough to store a predetermined volume of the image data;

a recording unit that records, on a recording medium, image data recorded on the memory; and a display controller that, while the recording unit is recording the image data on the recording medium, controls to simultaneously display an image of image data currently being sensed output from the image sensor in a first predetermined area of a display unit and an image of the image data being recorded on the recording medium in a second predetermined area of the display unit.

According to the present invention, the foregoing object is also attained by providing an image sensing apparatus control method comprising:

an image sensing step of sensing light from an object and outputting electrical image data;

a storage step of storing a predetermined volume of the image data;

a recording step of recording, on a recording medium, image data recorded in the storage step; and a control step of, while the image data is being recorded on the recording medium in the recording step, controlling to simultaneously display an image of image data currently being sensed output in the image sensing step in a first predetermined area of a display unit and display an image of the image data being recorded on the recording medium in a second predetermined area of the display unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a view showing an example of a selection screen for selecting contents to be displayed in a sub-display area according to embodiments of the present invention.

DETAILED DESCRIPTION OF THE PREFERRED EMBODIMENTS

Preferred embodiments of the present invention will be described in detail in accordance with the accompanying drawings.

As an embodiment to which the present invention is applied, the arrangement of an image sensing apparatus 100 will first be explained with reference to FIG. 1. Note that the image sensing apparatus 100 is an image sensing apparatus which has the function of sensing an image and the function of storing a sensed image in a removable storage medium, such as a video recorder equipped with camera (a digital video camera), digital still camera, portable terminal with a camera, or the like and is.

Figure 1:
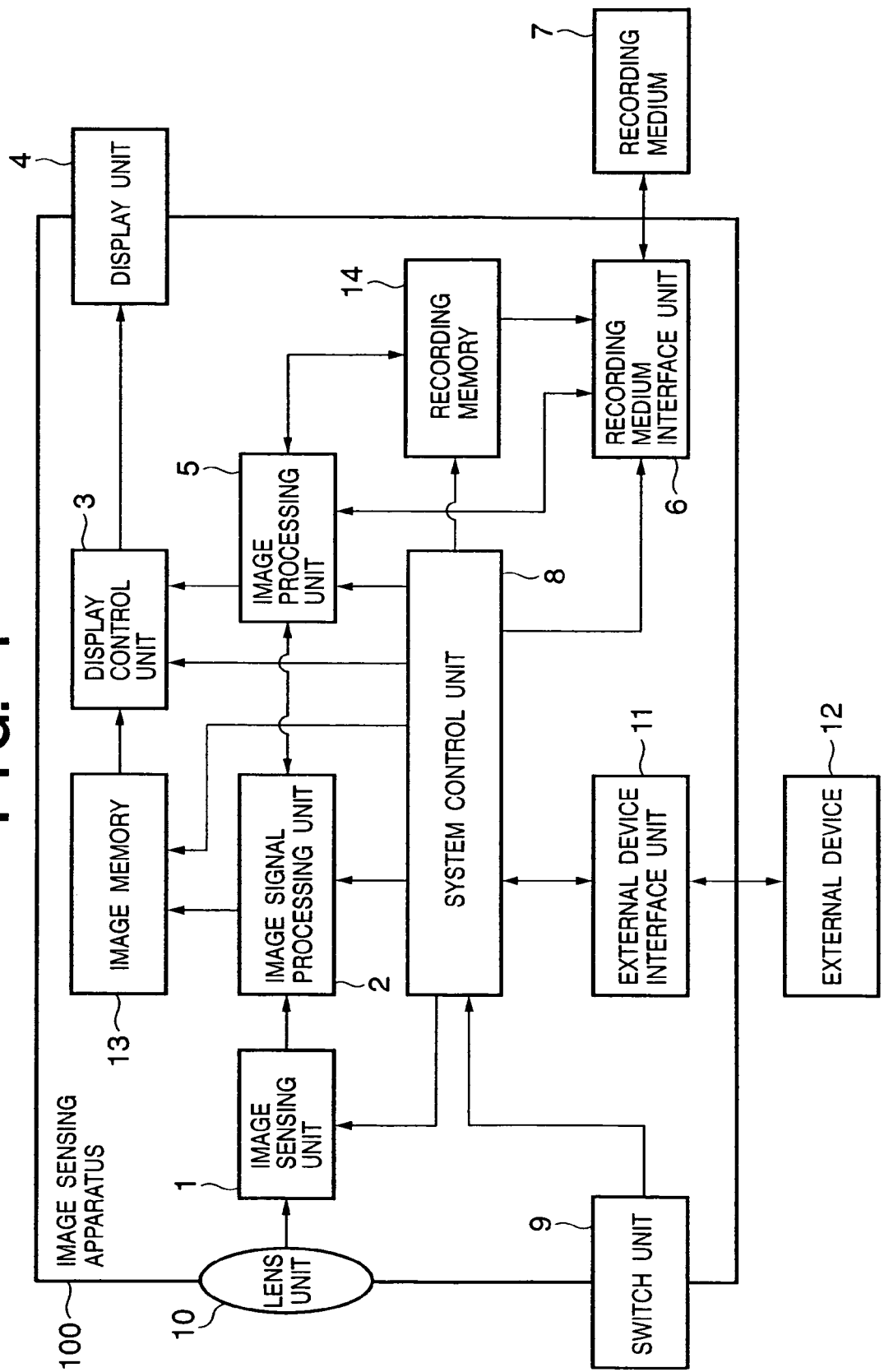
FIG. 1 is a block diagram showing the schematic arrangement of an image sensing apparatus according to an embodiment of the present invention.

In FIG. 1, reference numeral 10 denotes a lens unit; 1, an image sensing unit which converts, into an electrical signal, an optical image of an object incident through the lens unit 10; 2, an image signal processing unit which performs, for the electrical signal from the image sensing unit 1, predetermined processing including A/D conversion, signal level adjustment, pixel interpolation, color conversion, and the like; 13, an image memory which temporarily stores the electrical signal (image data) processed by the image signal processing unit 2; 3, a display control unit which controls display data to be displayed on a display unit 4; 4, the display unit which displays an image of the display data under the control of the display control unit 3; and 5, an image processing unit which performs processing including compression/expansion or enlargement/reduction for image data from the image signal processing unit 2. The image sensing apparatus 100 may be arranged such that the image processing unit 5 is connected to the image memory 13 to read out and process image data from the image memory 13.

Reference numeral 7 denotes a removable recording medium such as an optical disk (a DVD) or flash memory card; 6, a recording medium interface unit for controlling the process of recording on or reading from the recording medium 7; 8, a system control unit which controls respective units; and 9, a switch unit which includes a power switch, operation selector switch, photo key, moving image sensing key, playback switch, fast forward switch, rewind switch, image display key, setup key, and the like. Reference numeral 11 denotes an external device interface unit which controls USB, IEEE1394, or the like; 12, an external device such as a printer or host computer; and 14, a recording memory which temporarily stores image data having undergone image processing by the image processing unit 5.

First Embodiment

Figure 2:
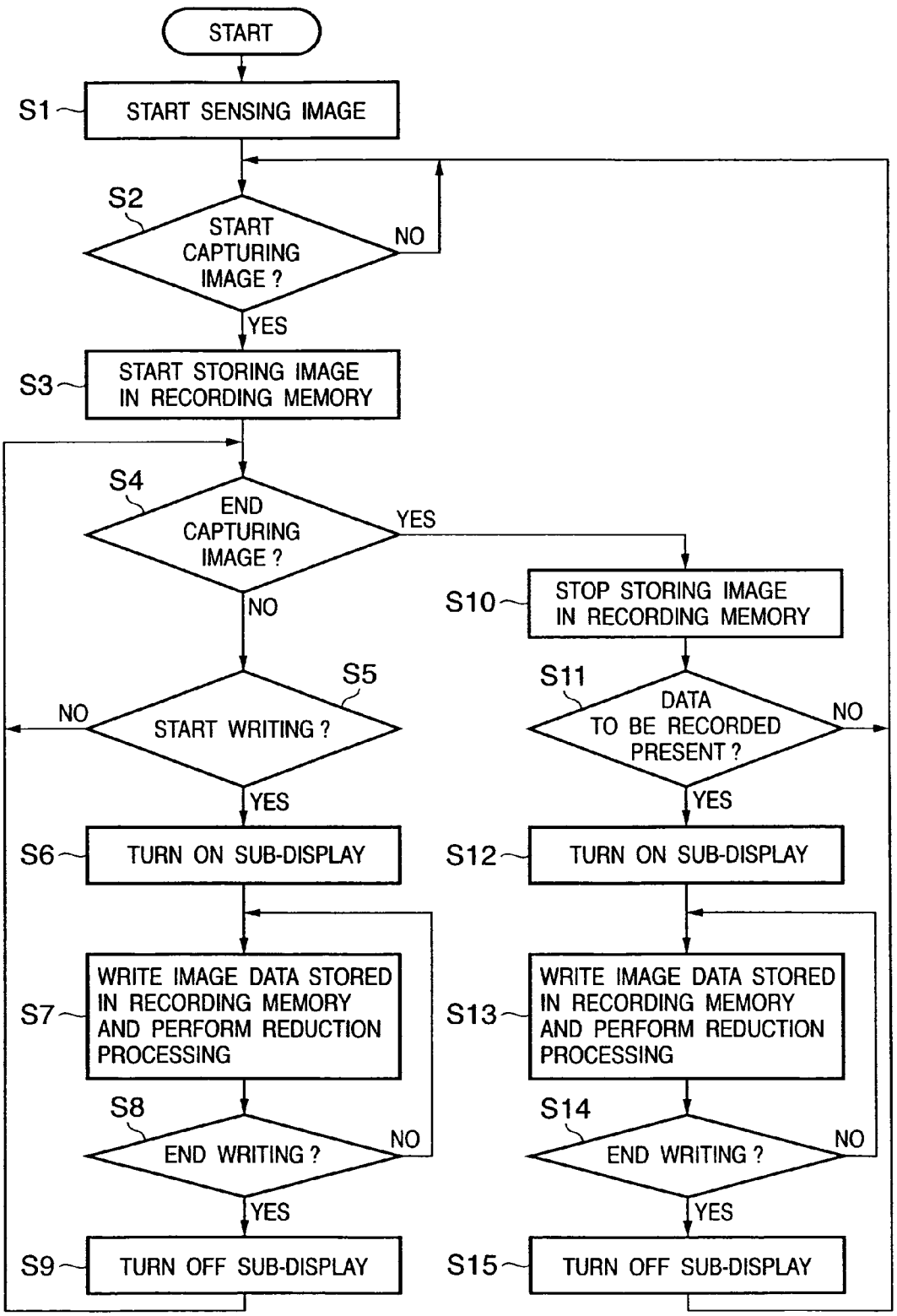
FIG. 2 is a flowchart showing image sensing and recording operations according to a first embodiment of the present invention.
Figure 3:
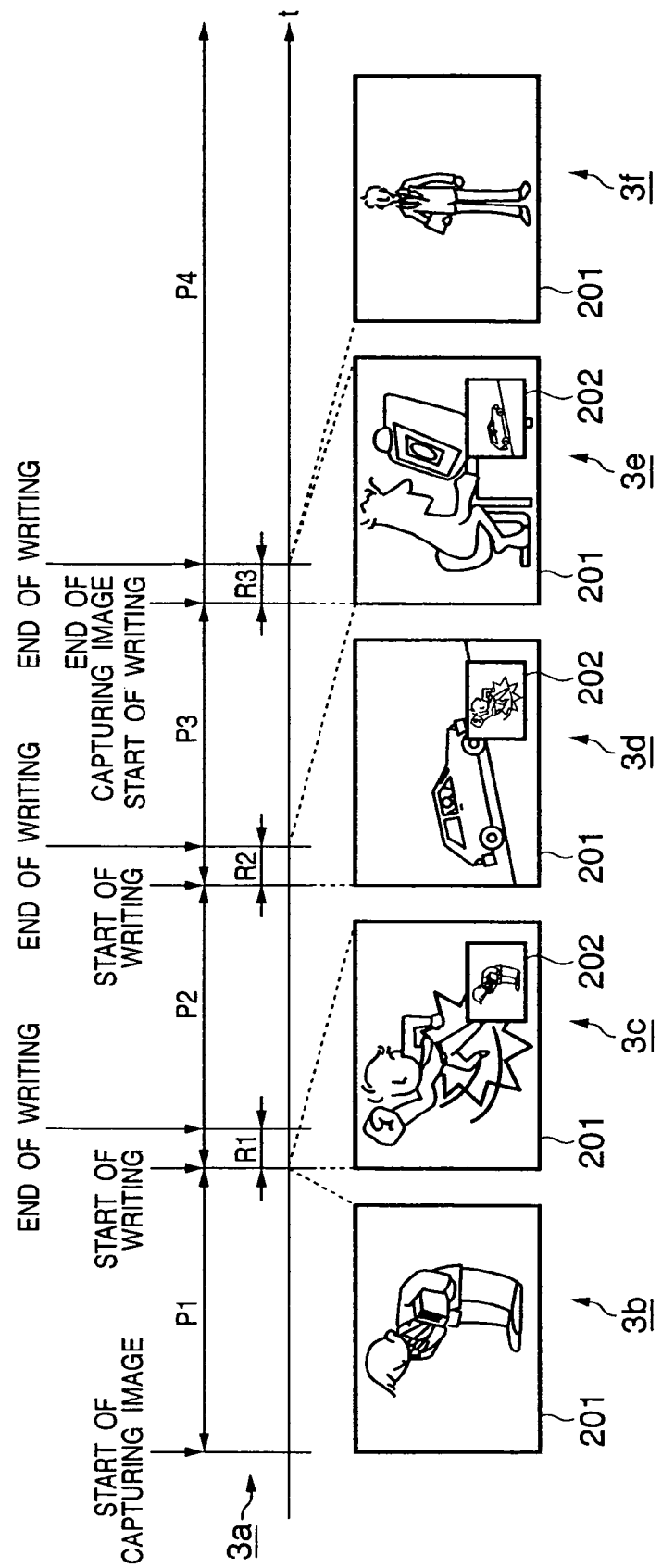
FIG. 3 is a view for explaining the relationship between the image sensing and recording operations and display contents according to the first embodiment of the present invention.

Image sensing and recording operations according to the first embodiment of an image sensing apparatus 100 with the above-described configuration will be explained with reference to the flowchart in FIG. 2 and FIG. 3. Note that FIG. 3 is a view for explaining the relationship between the image sensing and recording operations shown in FIG. 2 and the display contents on the display unit 4. Reference character 3a in FIG. 3 denotes the timing of image sensing and recording while reference characters 3b to 3f denote examples of display contents.

Step S1 is executed when a power switch of the switch unit 9 of the image sensing apparatus 100 is on, and the mode is switched to an image sensing mode by the operation selector switch. In step S1, a sensed image starts to be displayed on the display unit 4. At this time, the process of recording the sensed image has not started yet, and a so-called electronic finder function is in operation. More specifically, the image sensing unit 1 first obtains an electrical signal corresponding to the amount of light in an optical image of an object incident through the lens unit 10. The image signal processing unit 2 subjects the electrical signal to predetermined processing to convert it into image data, which is stored in the image memory 13. The display control unit 3 reads the image data stored in the image memory 13, processes the image data into a format suitable for display, and displays it on the display unit 4. Reference character 3b in FIG. 3 denotes the image displayed on the display unit 4 at this time, and the image is displayed in a main display area 201.

In step S2, an image sensing instruction is waited for. If an image sensing instruction is issued, the flow shifts to step S3 to start image sensing. In step S3, the process of storing, in the image memory 13, image data processed by the image signal processing unit 2 and at the same time subjecting the image data to compression processing in an image processing unit 5 to store it in a recording memory 14 starts. An image displayed on the display unit 4 at this time is also in a state as denoted by reference character 3b in FIG. 3. An image sensed over an image sensing period P1 is continuously displayed in the main display area 201.

In step S4, it is determined whether an image sensing end instruction has been issued. If no image sensing end instruction has been issued, the flow advances to step S5; otherwise, the flow advances to step S10.

In step S5, it is determined whether to start writing the image data stored in the recording memory 14 to the recording medium 7. More specifically, it is determined whether a preset recording start condition, such as that the volume of the data stored in the recording memory 14 be equal to or more than a predetermined volume or that the time over which the data is stored in the recording memory 14 be equal to or more than a predetermined time, is met. If the recording start condition is met, the flow advances to step S6. In step S6, a recording medium interface unit 6 starts the process of writing the image data to a recording medium 7. On the other hand, if the recording start condition is not met (NO in step S5), the flow returns to step S4 to repeat the determinations in steps S4 and S5.

In step S6, the display control unit 3 activates (turns on) the display of a sub-display within the main display area 201, and the flow shifts to step S7.

In step S7, the recording medium interface unit 6 reads out the image data stored in the recording memory 14 and writes it to the recording medium 7. At the same time, the image processing unit 5 reads out the image data stored in the recording memory 14, performs reduction processing for the read-out image data, and sends the image data having undergone the reduction processing to the display control unit 3. Note that the system control unit 8 controls to synchronously perform the process of writing to the recording medium 7 and the reduction processing by the image processing unit 5. For example, when the recording medium interface unit 6 is performing writing at N-times speed, the recording medium interface unit 6 controls to perform playback at the same speed as the recording speed, i.e., N-times speed from the recording memory 14. The display control unit 3 combines the image data stored in the image memory 13 (image data currently being newly stored in the image memory 13) with the reduced image data from the image processing unit 5 to display the combined image data on the display unit 4. Reference character 3c in FIG. 3 denotes an example of a screen displayed on the display unit 4 at this time. An image sensed over an image sensing period P2 is displayed in the main display area 201. In the meantime, the image data of an image written to the recording medium 7 over a recording period R1 is displayed in a sub-display area 202 within the main display area 201. The example denoted by reference character 3c shows a case wherein the image sensed and stored in the recording memory 14 over the image sensing period P1 is written at N-times speed over the recording period R1.

Even if the size of the display unit 4 is limited as in the case of a digital video camera, the display of the sub-display within the main display area 201 as denoted by reference character 3c makes it possible to display an image currently being sensed more visibly than when the sub-display is displayed outside the main display area 201.

In step S8, it is determined whether the writing process has ended. It is determined that the writing process has ended if the preset condition, such as that the volume of the image data recorded on the recording memory 14 fall below a predetermined volume or that writing of image data corresponding to a predetermined image sensing period have ended, is met. If the writing process has not ended, the flow returns to step S7 to repeat the writing process. When the writing process ends, the flow advances to step S9. In step S9, the display control unit 3 deactivate (turns off) the display of the sub-display and displays only the main display as denoted by reference character 3b in FIG. 3. The flow returns to step S4.

If it is determined again in step S4 that the image sensing has not ended, the above-described processes in steps S5 to S8 are repeated. As shown as a screen denoted by reference character 3d in FIG. 3, an image sensed over an image sensing period P3 is displayed in the main display area 201. While the image sensed and stored in the recording memory 14 over the image sensing period P2 is written to the recording medium 7 over a recording period R2, the image is displayed in the sub-display area 202. When the writing process ends, the display control unit 3 turns off the display of the sub-display and displays only the main display. The flow returns to step S4.

If it is determined in step S4 that the image sensing has ended, image data storage in the recording memory 14 is stopped in step S10, and it is checked in step S11 whether the recording memory 14 contains image data. If the recording memory 14 contains no image data, the flow returns to step S2; otherwise, the flow shifts to step S12.

In step S12, the display control unit 3 turns on the display of the sub-display, and the flow shifts to step S13.

In step S13, the recording medium interface unit 6 reads out the image data stored in the recording memory 14 and writes it to the recording medium 7. At the same time, the image processing unit 5 reads out the image data stored in the recording memory 14, performs reduction processing for the read-out image data, and sends the image data having undergone the reduction processing to the display control unit 3. Similarly to step S7, the system control unit 8 controls to synchronously perform the process of writing to the recording medium 7 and the reduction processing by the image processing unit 5. For example, when the recording medium interface unit 6 is performing writing at N-times speed, the recording medium interface unit 6 controls to perform playback at the same speed as the recording speed, i.e., N-times speed from the recording memory 14. The display control unit 3 combines the image data stored in the image memory 13 with the reduced image data from the image processing unit 5 to display the combined image data on the display unit 4. Reference character 3e in FIG. 3 denotes an example of a screen displayed on the display unit 4 at this time. The example shows a case wherein an image sensed over an image sensing period P4 is displayed in the main display area 201, and while the image sensed and stored in the recording memory 14 over the image sensing period P3 is written to the recording medium 7 over a recording period R3, the image is displayed in the sub-display area 202.

In step S14, it is determined whether the writing process has ended. The determination is performed in the same manner as in step S8. If the writing process has not ended, the flow returns to step S13 to repeat the writing process. When the writing process ends, the flow advances to step S15. In step S15, the display control unit 3 turns off the display of the sub-display, and the flow returns to step S2. The display control unit 3 returns to display only the main display as denoted by reference character 3f in FIG. 3.

As described above, according to the first embodiment, an image being sensed is displayed in the main display area. When writing to the recording medium, the sub-display is displayed, and an image obtained by reducing an image to be recorded is played back within the sub-display area at the same speed as the recording speed. For this reason, the user can easily recognize that writing is in progress and which scene is being written. Also, the progress of the process of recording on the recording medium can be kept track of by viewing a scene being displayed in the sub-display area. This makes it possible to inhibit the user from handling the image sensing apparatus in a manner which may adversely affect the recording process.

When an image being sensed is to be displayed in the main display area, a character string such as "image sensing in progress" or "REC" or a symbol indicating that recording is in progress may be displayed while the image is being stored in the recording memory 14. With this operation, the user can recognize that a displayed image is being recorded.

Second Embodiment

Figure 4:
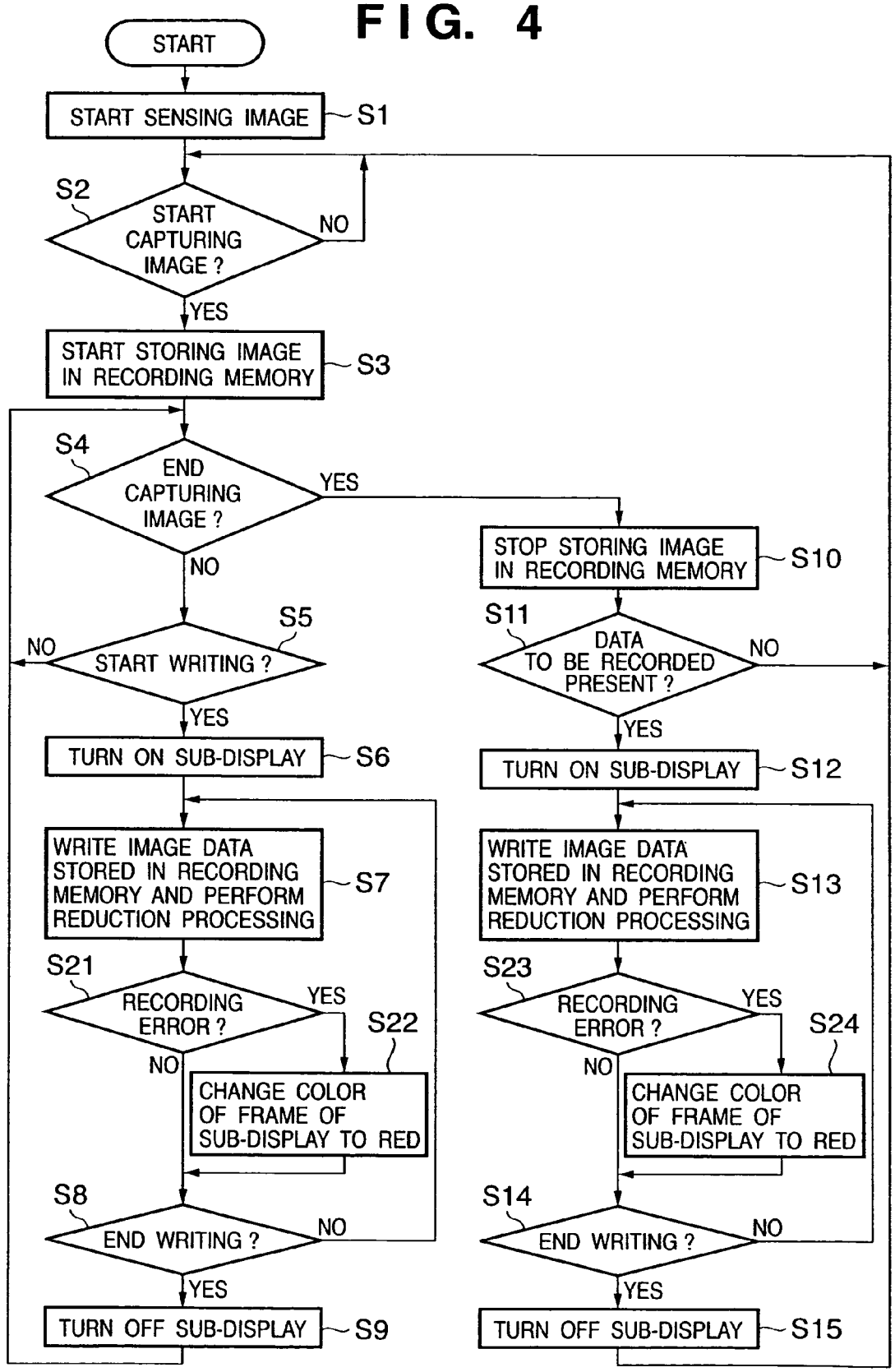
FIG. 4 is a flowchart showing image sensing and recording operations according to a second embodiment of the present invention.
Figure 5:
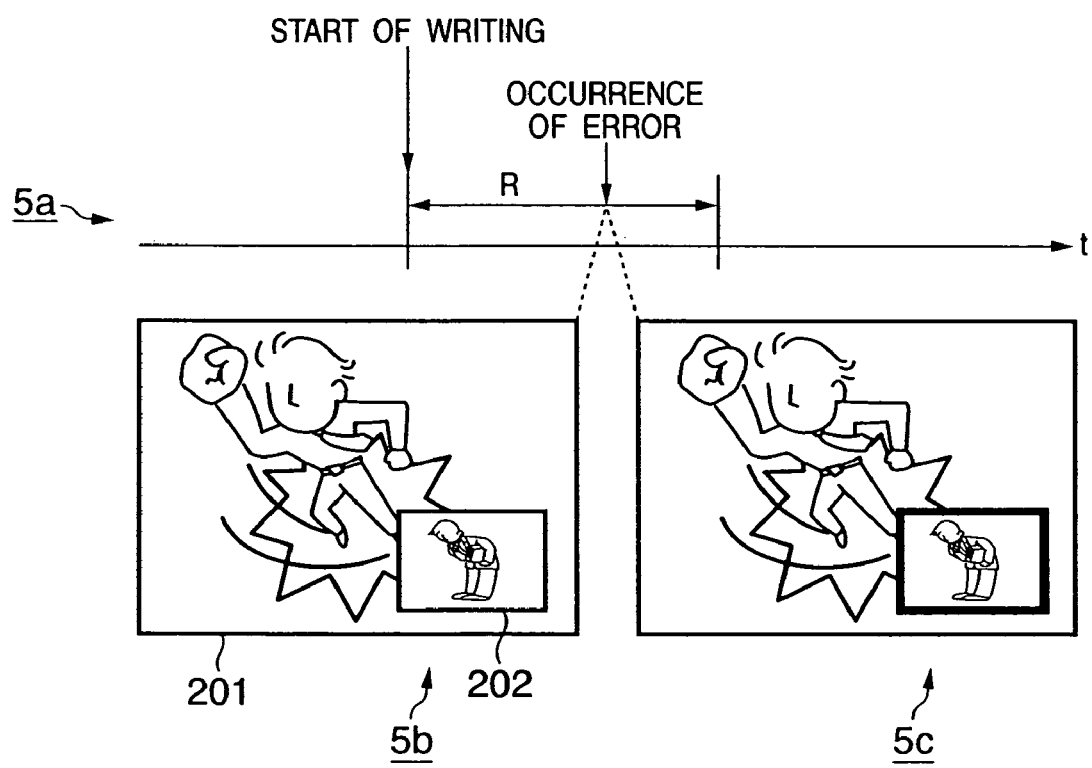
FIG. 5 is a view for explaining the display contents at the occurrence of a writing error according to the second embodiment of the present invention.

Image sensing and recording operations according to the second embodiment of an image sensing apparatus 100 will be explained with reference to the flowchart in FIG. 4 and FIG. 5.

This embodiment will explain a case wherein an error has occurred during the process of writing to a recording medium 7. Note that the same reference numerals in FIG. 4 denote the same processes as those in FIG. 2, and an explanation thereof will be omitted.

In step S7, writing of image data stored in a recording memory 14 to the recording medium 7 and the process of displaying the image data on a reduced scale in a sub-display area 202 are performed. In step S21, it is detected whether the writing to the recording medium 7 is normally performed (e.g., whether a recording error such as mistracking has occurred on a DVD). If no error is detected, the flow directly shifts to step S8. On the other hand, if an error is detected, the flow shifts to step S22. In step S22, a display control unit 3 changes the color of the frame of a sub-display such that the user can recognize the occurrence of the error and displays the changed sub-display. The flow shifts to step S8. For example, the frame of the sub-display is displayed in white when no error has occurred. If an error occurs, the color of the frame of the sub-display is changed to, e.g., red, and the changed sub-display is displayed in step S22. Reference character 5a in FIG. 5 shows that an error has occurred during a period R when image data is written to the recording medium 7. Reference character 5b denotes the contents displayed on the display unit 4 before the occurrence of the error; and 5c, the contents displayed after the occurrence of the error.

If a writing error occurs, control is performed such that it is determined in step S8 or step S14 that the writing has ended, and such that it is determined in the process in step S4 that a writing start condition is not met.

Similarly, after the image sensing, writing of image data stored in the recording memory 14 to the recording medium 7 and the process of displaying the image data on a reduced scale in the sub-display area 202 are performed in step S13. In step S23, it is detected whether the writing to the recording medium 7 is normally performed (e.g., whether a recording error such as mistracking has occurred on a DVD). If no error is detected, the flow directly shifts to step S14. On the other hand, if an error is detected, the flow advances to step S24. In step S24, the display control unit 3 changes the color of the frame of the sub-display such that the user can recognize the occurrence of the error and displays the changed sub-display. The flow shifts to step S14.

As described above, by making the color of the frame of the sub-display at the time of normal writing different from that at the occurrence of an error, the user can recognize that a recording error has occurred.

The second embodiment has explained that the frame of the sub-display is displayed in white at the time of normal writing and is displayed in red at the occurrence of an error. The present invention is, of course, not limited to these colors. Any colors may be used as far as they are different. Note that at the occurrence of an error, the frame of the sub-display is preferably displayed in a color which attracts the user's attention.

The second embodiment has explained a case wherein the color of the frame of the sub-display is changed. The present invention, however, is not limited to this. Any method may be used as far as the display state of the sub-display area at the time of normal writing is made different from that at the occurrence of an error. More specifically, the width or type of each frame may be changed, the color of an image within the sub-display area may be diluted, or the sub-display area may be shaded.

In the second embodiment, if an error has occurred, control is performed such that the writing ends in step S8 immediately after the color of the frame of the sub-display is changed. Alternatively, control may be performed such that the writing to the recording medium 7 is retried a predetermined number of times or for a predetermined time, and the writing ends if the retries are unsuccessful. In this case, the number or duration of retries may be further displayed.

Third Embodiment

Figure 6:
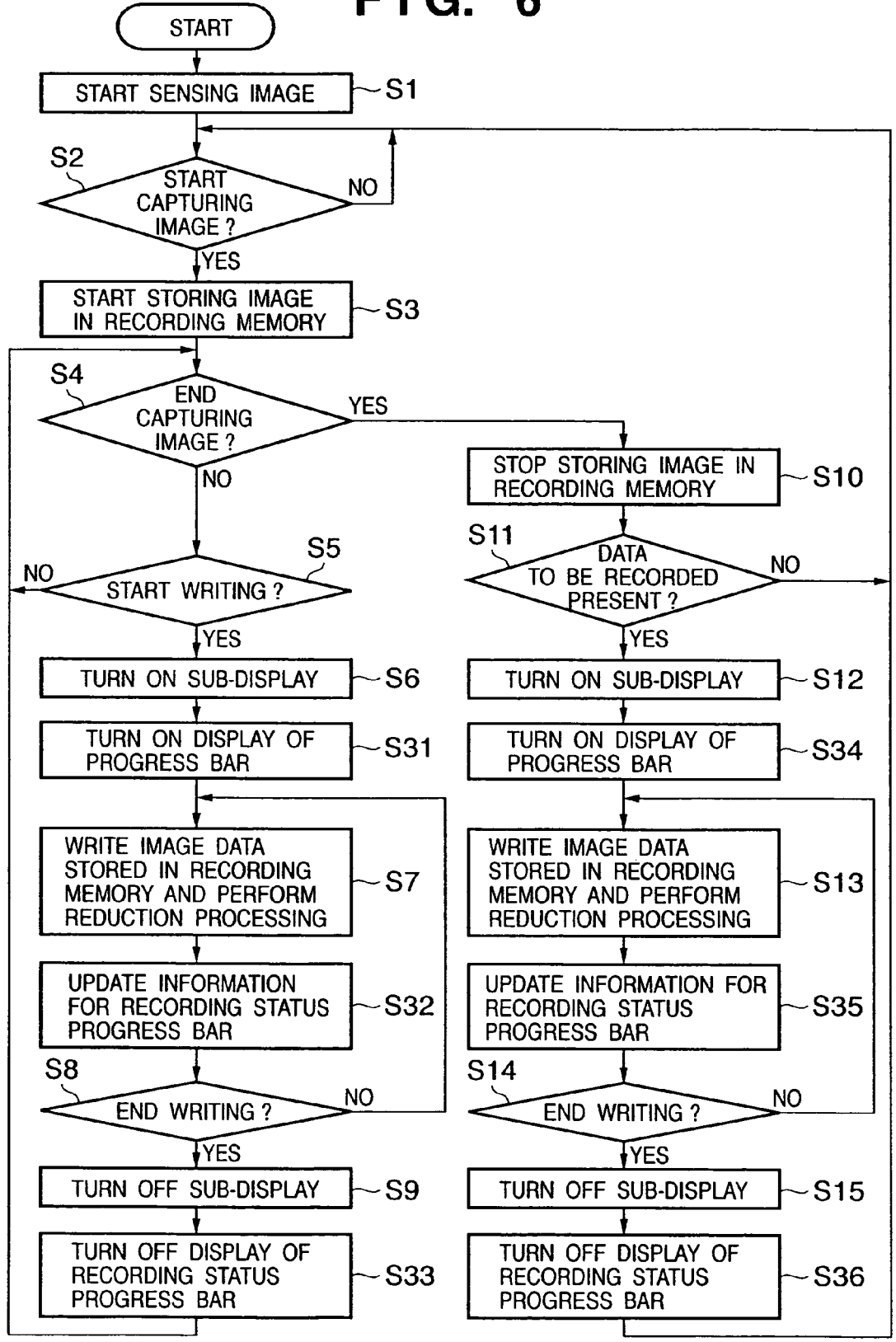
FIG. 6 is a flowchart showing image sensing and recording operations according to a third embodiment of the present invention.
Figure 7:
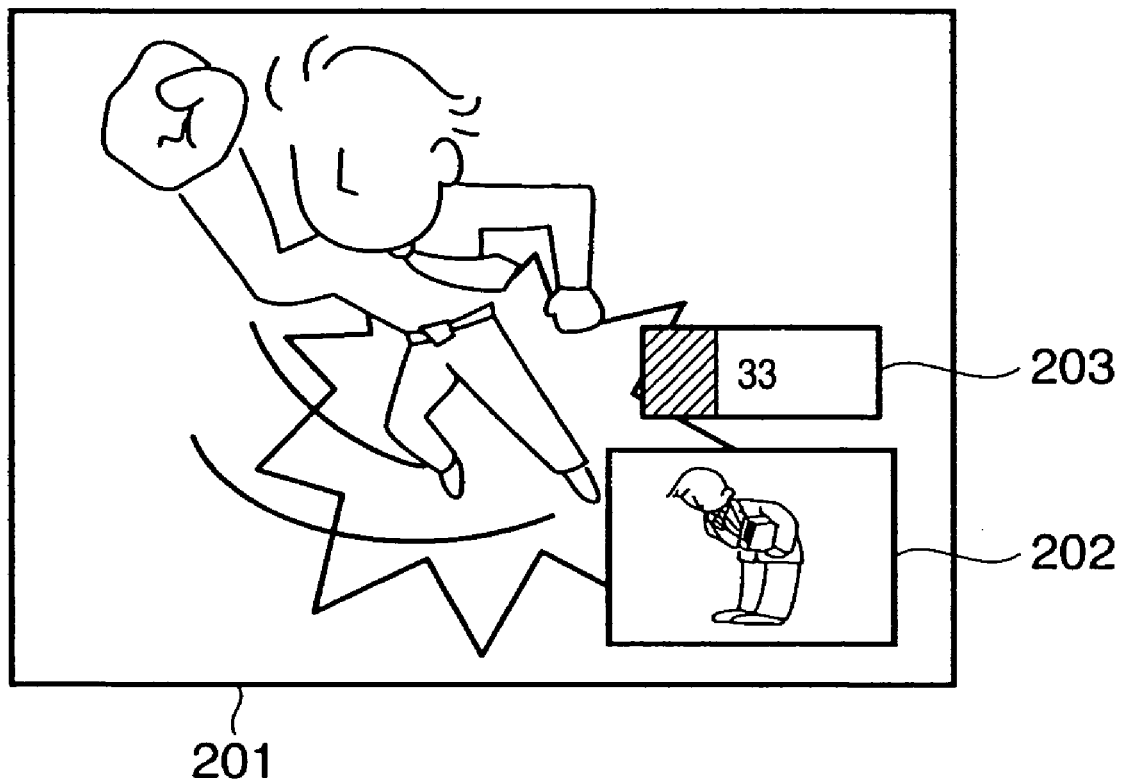
FIG. 7 is a view for explaining the display contents at the time of writing according to the third embodiment of the present invention.

Image sensing and recording operations according to the third embodiment of an image sensing apparatus 100 with the above-described arrangement will be explained with reference to the flowchart in FIG. 6 and FIG. 7.

This embodiment will explain a case wherein a progress bar indicating the progress of writing to a recording medium 7 is displayed. Note that the same reference numerals in FIG. 6 denote the same processes as those in FIG. 2, and an explanation thereof will be omitted as appropriate.

In step S6, a display control unit 3 turns on the display of a sub-display within a main display area 201. In step S31, the display control unit 3 also turns on the display of the progress bar indicating the writing status.

In step S7, a recording medium interface unit 6 reads out the image data stored in a recording memory 14 and writes it to the recording medium 7. At the same time, the image processing unit 5 reads out the image data stored in the recording memory 14, performs reduction processing for the read-out image data, and sends the image data having undergone the reduction processing to the display control unit 3.

In step S32, the status of the writing to the recording medium 7 is calculated to update progress bar information. Display data is created on the basis of the progress bar information and is displayed on a display unit 4. FIG. 7 shows an example of a screen which further displays a progress bar 203 according to the third embodiment. In the example, a number indicating the progress of the writing process is also displayed. The flow shifts to step S8.

In step S8, it is determined whether the writing process has ended. When the writing process ends, the display control unit 3 turns off the display of the sub-display in step S9. In step S33, the display control unit 3 also turns off the display of the progress bar.

Similarly, after the image sensing, the display control unit 3 turns on the display of the sub-display within the main display area 201 in step S12. The display control unit 3 also turns on the display of the progress bar indicating the writing status in step S34.

In step S13, the recording medium interface unit 6 reads out the image data stored in the recording memory 14 and writes it to the recording medium 7. At the same time, the image processing unit 5 reads out the image data stored in the recording memory 14, performs reduction processing for the read-out image data, and sends it to the display control unit 3.

In step S35, the status of the writing to the recording medium 7 is calculated to update the progress bar information. Display data is created from the progress bar information and is displayed on the display unit 4, as shown in FIG. 7. The flow shifts to step S8.

In step S14, it is determined whether the writing process has ended. When the writing process ends, the display control unit 3 turns off the display of the sub-display in step S15. In step S36, the display control unit 3 also turns off the display of the progress bar.

As described above, according to the third embodiment, the user can keep track of the progress of the writing process.

Fourth Embodiment

Figure 8:
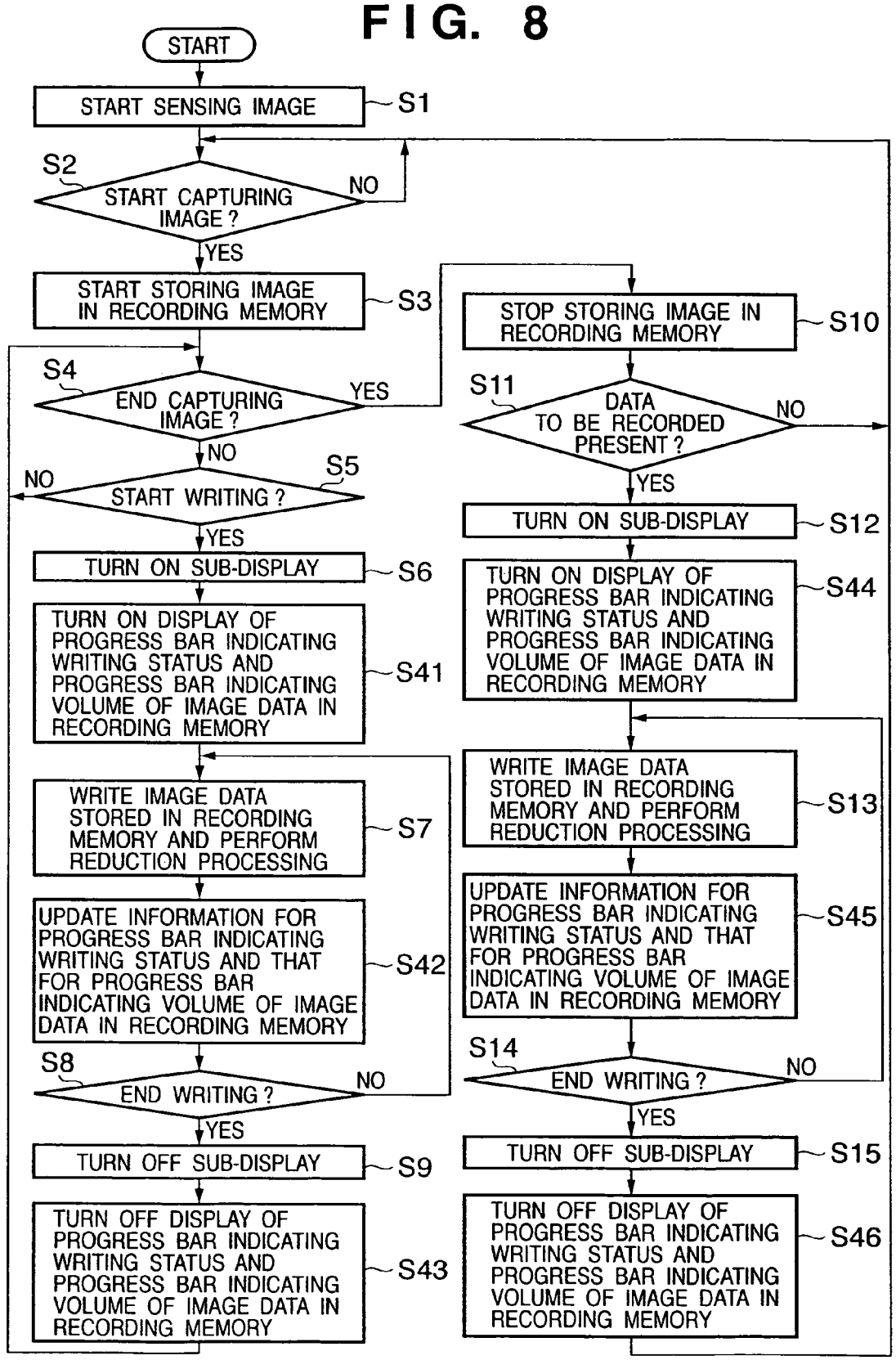
FIG. 8 is a flowchart showing image sensing and recording operations according to a fourth embodiment of the present invention.
Figure 9:
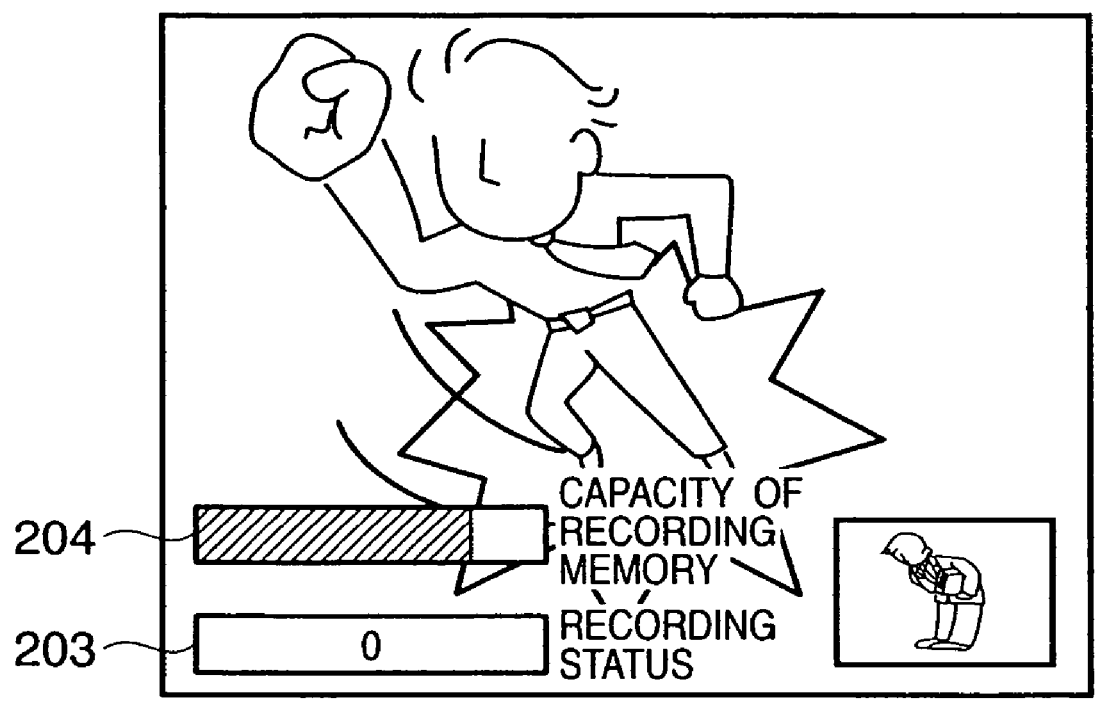
FIG. 9 is a view for explaining the display contents at the time of writing according to the fourth embodiment of the present invention.

Image sensing and recording operations according to the fourth embodiment of an image sensing apparatus 100 will be explained with reference to the flowchart in FIG. 8 and FIG. 9.

This embodiment will explain a case wherein a progress bar indicating the status of accumulation of image data in a recording memory and the free space of the recording memory is further displayed in addition to a progress bar indicating the progress of writing explained in the third embodiment. Note that the same reference numerals in FIG. 8 denote the same processes as those in FIG. 6 explained in the third embodiment, and an explanation thereof will be omitted.

In step S41, a display control unit 3 turns on the display of the progress bar indicating the status of writing to a recording medium 7 and at the same time turns on the display of the progress bar indicating the volume of the image data in a recording memory 14. The flow shifts to step S7.

In step S42, the status of the writing to the recording medium 7 is calculated, and at the same time the volume of the image data in the recording memory 14 is calculated. Progress bar information for the respective progress bars are updated. Display data are created on the basis of the updated progress bar information and are displayed on a display unit 4. FIG. 9 shows an example of a screen which further displays a progress bar 203 indicating the writing status and a progress bar 204 indicating the volume of the image data in the recording memory 14 according to the fourth embodiment. Since in this embodiment, the two kinds of progress bars are displayed, the contents indicated by the progress bars are also displayed in characters ("capacity of recording memory" and "recording status"). The flow shifts to step S8.

In step S43, the display control unit 3 turns off the display of the progress bars.

Similarly, after the image sensing, the display control unit 3 turns on the display of the progress bar 203 indicating the status of the writing to the recording medium 7 and at the same time turns on the display of the progress bar 204 indicating the volume of the image data in the recording memory 14 in step S44. The flow shifts to step S13.

In step S45, the status of the writing to the recording medium 7 is calculated, and at the same time the volume of the image data in the recording memory 14 is calculated. The progress bar information are updated. Display data are created on the basis of the updated progress bar information and are displayed on the display unit 4, as shown in FIG. 9. The flow shifts to step S14.

In step S46, the display control unit 3 turns off the display of the progress bars.

As described above, according to the fourth embodiment, the user can keep track of the volume of the image data stored in the recording memory 14 and what percentage of the recording memory 14 is free.

Figure 10:
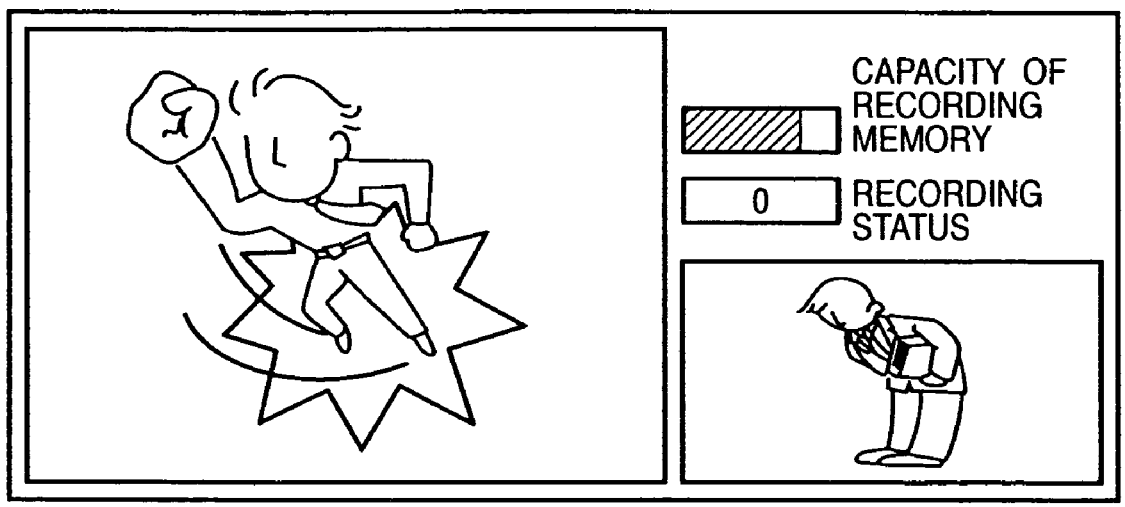
FIG. 10 is a view showing another display example according to the fourth embodiment of the present invention.

Note that a sub-display area and the progress bars need not be displayed within a main display area. Any or all of them may be arranged and displayed outside the main display area. FIG. 10 shows such an example.

This embodiment may be arranged such that the user can arbitrarily move the display position of each of the main display area, sub-display area, and progress bars by operating a switch of a switch unit 9 or an operation section (not shown).

Further, the sub-display area and progress bars may be displayed outside the main display area in the first to third embodiments as well.

Each of the first to fourth embodiments has explained a case wherein an image currently being written to the recording medium 7 is displayed in the sub-display area at the same speed as the writing speed. The present invention, however, is not limited to this. For example, an image of one frame such as the first frame image or a representative image of image data to be recorded may be continuously displayed during a writing period from the beginning of recording.

Also, each of the first to fourth embodiments has explained a case wherein an image of image data being written is displayed within the sub-display area. However, the sub-display may be turned off, or another image may be additionally displayed. FIG. 11 shows an example of a selection screen displayed on the display unit 4 for selecting display contents for the sub-display area.

Other Embodiments

The invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-259978 filed on Sep. 7, 2004, which is hereby incorporated herein by reference herein.

What is claimed is:

1. An image sensing apparatus comprising:
   an image sensor that senses light from an object and outputs electrical image data;
   a memory that has capacity enough to store a predetermined volume of the image data;
   a recording unit that records, on a recording medium, image data recorded on said memory; and
   a display controller that, while said recording unit is recording the image data on the recording medium, controls to simultaneously display an image of image data currently being sensed output from said image sensor in a first predetermined area of a display unit and an image of the image data being recorded on the recording medium in a second predetermined area of the display unit.

2. The image sensing apparatus according to claim 1, wherein said recording unit records the image data at one of each time when a predetermined volume of image data is stored in the recording medium and predetermined time intervals since a beginning of recording of image data on the recording medium.

3. The image sensing apparatus according to claim 1, wherein said display controller controls to display the image of the image data currently being recorded at the same speed as a speed of recording the image data on the recording medium.

4. The image sensing apparatus according to claim 3, wherein said recording unit can record the image data on the recording medium at a speed which is a plurality of times higher than normal.

5. The image sensing apparatus according to claim 1, wherein said display controller controls to display an image of one predetermined frame of the image data recorded on the recording medium within the second predetermined area.

6. The image sensing apparatus according to claim 1, further comprising a determination unit that determines whether recording by said recording unit is normally performed or an error has occurred, wherein
    said display controller performs display control so as to display the second predetermined area differently when the recording by said recording unit is normally performed from when an error has occurred.

7. The image sensing apparatus according to claim 6, wherein
    if said determination unit determines that an error has occurred, said recording unit retries to record the image data being recorded, and
    said display controller controls to further display the number of retries by said recording unit.

8. The image sensing apparatus according to claim 1, wherein while the image data is being recorded on the recording medium, said display controller controls to further display, on said display unit, progress of the recording by said recording unit.

9. The image sensing apparatus according to claim 1, wherein while the image data is being recorded on the recording medium, said display controller controls to further display, on said display unit, a status of accumulation of the image data in the storage medium.

10. The image sensing apparatus according to claim 1, wherein the second predetermined area is located within the first predetermined area.

11. The image sensing apparatus according to claim 1, wherein the first predetermined area and the second predetermined area do not overlap each other.

12. The image sensing apparatus according to claim 1, further comprising an instruction unit that gives an instruction to change a position of at least one of the first predetermined area and the second predetermined area.

13. The image sensing apparatus according to claim 1, wherein said display controller displays, on a reduced scale, the image of the image data being recorded on the recording medium.

14. The image sensing apparatus according to claim 1, further comprising a selection unit that selects data to be displayed in the second predetermined area, wherein
    if said selection unit selects the image of the image data being recorded on the recording medium, said display controller controls to display the image in the second predetermined area.

15. The image sensing apparatus according to claim 1, further comprising a selection unit that selects one of display and hiding of the second predetermined area, wherein
    if said selection unit selects the display of the second predetermined area, said display controller controls to display an image in the second predetermined area.

16. An image sensing apparatus control method comprising:
    an image sensing step of sensing light from an object and outputting electrical image data;
    a storage step of storing a predetermined volume of the image data;
    a recording step of recording, on a recording medium, image data recorded in the storage step; and
    a control step of, while the image data is being recorded on the recording medium in the recording step, controlling to simultaneously display an image of image data currently being sensed output in the image sensing step in a first predetermined area of a display unit and display an image of the image data being recorded on the recording medium in a second predetermined area of the display unit.

17. An information processor readable storage medium storing a program code for implementing a control method according to claim 16.

* * * * *